United States Patent [19]

Sherman et al.

[11] Patent Number: 4,715,357
[45] Date of Patent: Dec. 29, 1987

[54] APPARATUS FOR COOKING FOOD

[76] Inventors: Victor Sherman, 13-10 34 Ave., Long Island City, N.Y. 11106; Ilya Zborovsky, 3285 Wolfson Dr., Baldwin, N.Y. 11510; William Sanchez, 35-69 169 St., Flushing, N.Y. 11358

[21] Appl. No.: 865,091

[22] Filed: May 20, 1986

Related U.S. Application Data

[63] Continuation-in-part of Ser. No. 801,781, Nov. 20, 1985, Pat. No. 4,627,335.

[51] Int. Cl.[4] .................. F24C 3/00; A47J 27/62; A23B 4/04
[52] U.S. Cl. ..................................... 126/39 H; 99/332; 99/349; 99/378; 99/379; 219/524; 219/525
[58] Field of Search ............... 126/39 H; 99/330, 331, 99/334, 335, 372, 373, 378, 379; 426/523; 100/93 P; 219/524, 525

[56] References Cited

U.S. PATENT DOCUMENTS

| | | | |
|---|---|---|---|
| 1,757,983 | 5/1930 | Tugendhat | 99/378 X |
| 2,136,764 | 11/1938 | Smith | 99/378 |
| 2,632,379 | 3/1953 | Kudo | 99/349 X |
| 2,770,182 | 11/1956 | Jensen | 99/379 |
| 3,620,156 | 11/1971 | Schindle et al. | 99/349 |
| 4,483,239 | 11/1984 | Mueller et al. | 99/379 X |
| 4,586,428 | 5/1986 | Adamson | 99/378 X |
| 4,601,237 | 7/1986 | Harter et al. | 99/379 X |

FOREIGN PATENT DOCUMENTS 417055  9/1934  United Kingdom ............... 219/525

Primary Examiner—Larry Jones
Attorney, Agent, or Firm—Ilya Zborovsky

[57] ABSTRACT

An apparatus for cooking food includes two plates, a heating device for heating the plates, a drive for driving one of the plates relative to the other so as to apply heat and pressure to an initial food material, and the drive is formed so that the one plate moves in a stepped manner. One of the plates can be movable or even removable in a different direction to provide for easy handling. A protective element can be placed between the plates and the initial food material during cooking, and withdrawn thereafter.

20 Claims, 19 Drawing Figures

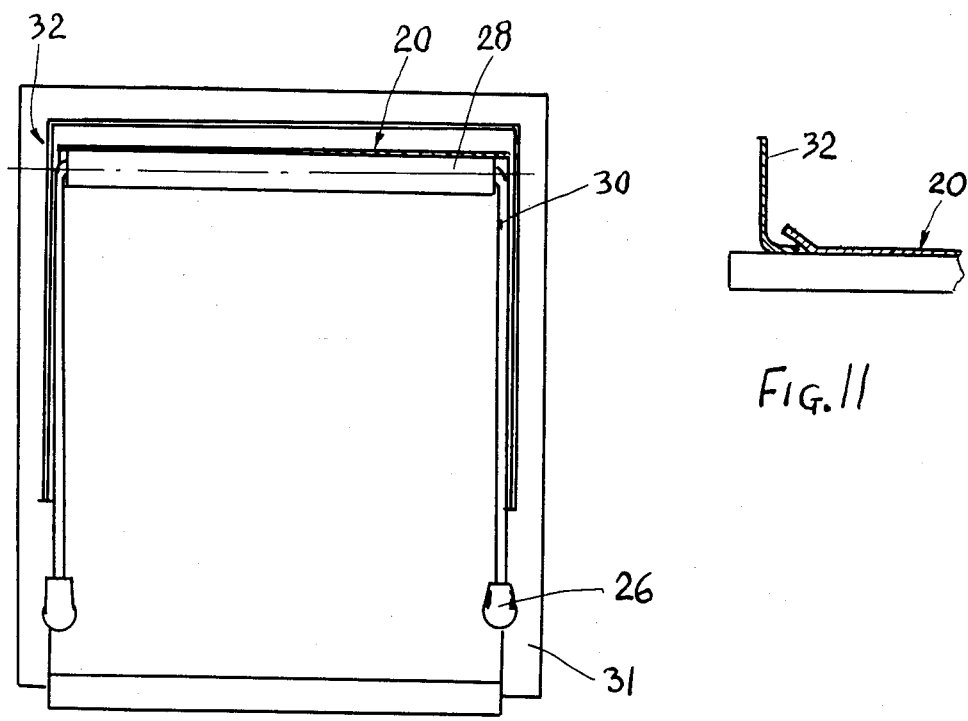
Fig. 8
Fig. 11
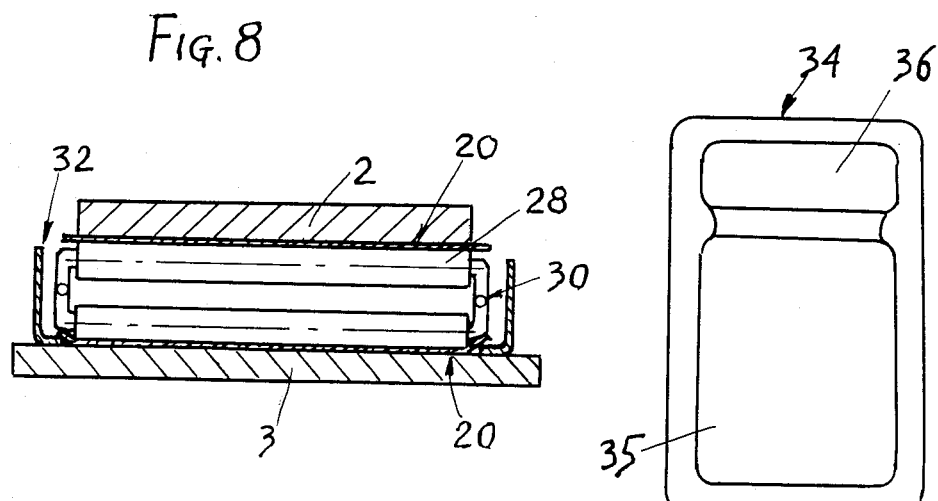
Fig. 12
Fig. 13
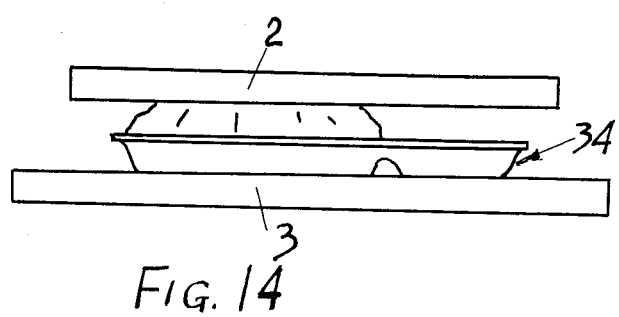
Fig. 14

APPARATUS FOR COOKING FOOD

CROSS REFERENCE TO A RELATED APPLICATION

This application is a continuation-in-part of U.S. patent application Ser. No. 801,781 filed on Nov. 26, 1985, now U.S. Pat. No. 4,627,335, issued 12-9-1986.

BACKGROUND OF THE INVENTION

The present invention relates to an apparatus for cooking food.

Apparatuses for cooking food are widely used and based on various principles. One of the known apparatuses is disclosed in the U.S. patent application Ser. No. 810,781 and includes two plates which are heatable and of which one plate is movable relative to the other plate so as to apply simultaneously heat and pressure to an initial food material. In this apparatus the speed of cooking is extremely high and generally varies within 0.5 and 1.5–2 min. Also, the taste and quality of final products cooked in the apparatus are high. The above described apparatus can be further improved in the sense of its performance and other aspects.

SUMMARY OF THE INVENTION

Accordingly, it is an object of the present invention to provide an improved apparatus for cooking food.

In keeping with this object, one feature of the present invention resides, briefly stated, in an apparatus for cooking food which has two plates, means for heating the plates relative to the other plates, and the driving means is formed so that the one plate moves by the driving means in a stepped manner.

When the apparatus is designed in accordance with the present invention, it provides for new and highly advantageous results. Since one plate does not move uninterruptedly, but instead moves interruptedly or in the stepped manner a new safety feature is provided in the following manner. If a user accidentally puts his or her hand between the plates, a continuously or uninterruptedly movable plate would inevitable catch the hand between the plates. However, when in accordance with the present invention one of the plates moves in a stepped manner, the user after the respective step of movement, even if his or her hand is in the zone between the plates, always has time to withdraw his hand before the next step of movement because this step can begin only when user pushes the starting button the next time. Thus, the stepped movement of one plate before cooking actually eliminates the possibility of accidents due to catching of parts of user's body between the plates.

The stepped movement of one plate provides high advantages during cooking as well. It is virtually impossible to provide such a drive which after each step of movement stops the plate momentarily and absolutely immovably. The drive always has an insignificant recoil so that the plate which moves and then stops after each step of movement also somewhat springs back after being stopped. This stepped movement of one plate toward the other plate with some springing back produces in the initial food material a compression during each step of movement and a very small expansion during springing back. As a result of the alternating compression and expansion, movement of juices in the initial food material (meat, chicken, etc) is increased, displacement of small particles of the initial food material is accelerated ,and the process of cooking is intensified. This effect takes place even if the movable plate is stopped after each step of movement so that actually no springing back is caused, just because of the stepped nature of its movement.

Another very important feature of the present invention is that a protective element is insertable during cooking between the plates and the initial food material, and is withdrawable after cooking. This measure prevents excessive dirtying of the plates during cooking by components of the initial food material.

A further feature of the present invention is that one of the plates is withdrawable from the other plate in a direction which is different from the working direction , or even removable from the apparatus,for example to allow easy cleaning of the plates.

Still a further feature of the present invention is that the upper plate which receives more heat due to natural property of heat to move upwardly, is made smaller so as to equalize the quantity of heat accumulated in the plates.

Finally, means producing a steam barrier around the initial food material during cooking can be provided, for trapping the juices inside the food material.

The novel features of the present invention are set forth in particular in the appended claims. The invention itself will be best understood from the following description of preferred embodiments, accompanied by the following drawings.

BRIEF DESCRIPTION OF THE DRAWINGS

FIGS. 7 and 8 are side and plan views of cooking plates of the apparatus with a protective element placed between the plates and an initial food material;

FIGS. 10, 11 and 12 show modifications of a drive for the protective element and guide walls for the latter,respectively;

FIGS. 13 and 14 are plan and side views of a steam generating device;

DESCRIPTION OF PREFERRED EMBODIMENTS

Figure 1:
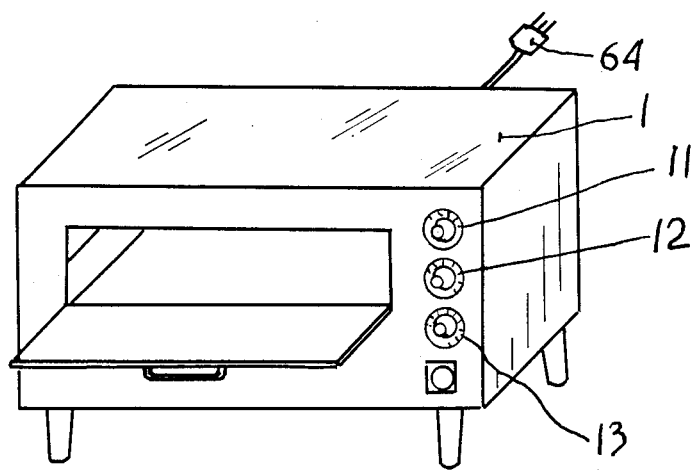
FIG. 1 is a perspective view of a cooking apparatus of the invention.
Figure 2:
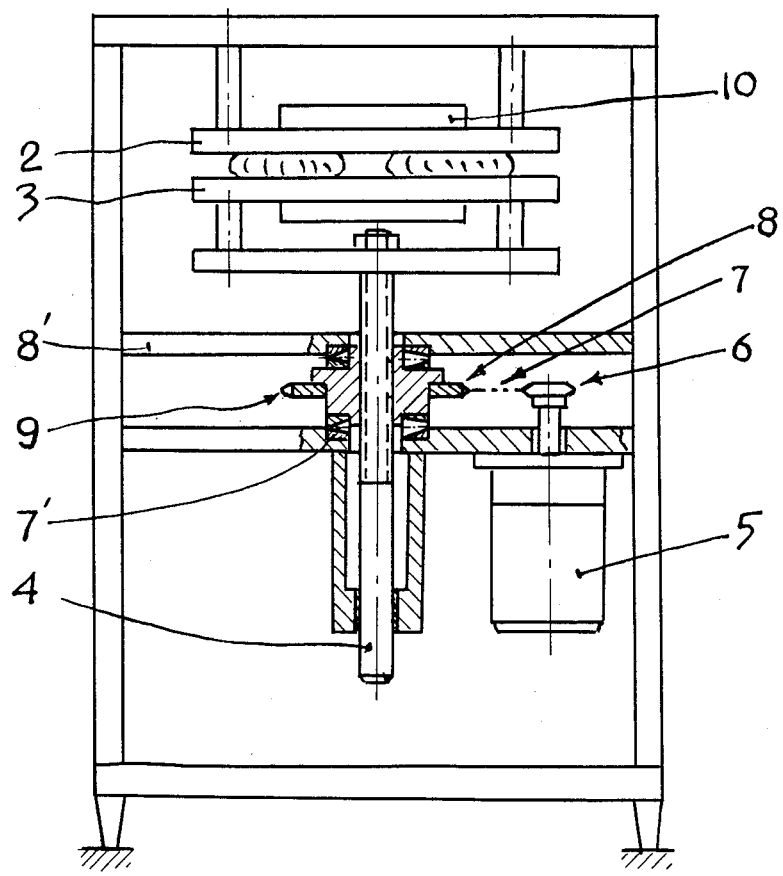
FIG. 2 is a view showing schematically the interior of the cooking apparatus.

A cooking apparatus in accordance with the present invention is shown in general in FIGS. 1 and 2. The cooking apparatus has a housing 1 which forms an interior of the apparatus for accommodating all inner parts and mechanisms. An upper plate of the apparatus is identified with reference numeral 2 and the lower plate with reference numeral 3. At least one plate, for example the lower plate 3 is vertically movable relative to the other plate, here the upper plate, between a distal position in which the plates are far from one another and a plurality of proximal positions in which the plates are close to one another for cooking an initial food material therebetween.

As can be seen from FIG. 2, there is a central screw 4, electric drive motor 5 drives, through a reducer, a driving sprocket 6, a chain 7, and a sprocket 8 mounted on a nut 9. The rotation of the nut results in vertical movement of the screw 4 and thereby the lower plate 3. The plates 2 and 3 are provided with electrical heaters 10. The cooking apparatus is provided with a knob 11 for adjusting a final thickness of a product produced from the initial food material, a timer 12 for setting a time of cooking from the moment when the initial food material is contacted by two plates and somewhat compressed to the moment of the withdrawal start of the lower plate from the upper plate, and a temperature control unit 13 which adjusts the desired temperature of cooking. Means for adjusting the pressure in the initial food material is also provided and adjusts the pressure in dependence upon the nature of the initial food material. The pressure adjusting means is disclosed in detail in our U.S. patent application Ser. No. 801,781 which is incorporated here by reference, and therefore is not described in the present application.

Before cooking, the temperature of the plates, the pressure to be provided in the food material, and the time of cooking are set by a user. Then the motor is actuated, the lower plate with an initial food material on it moves upwardly toward the upper plate so that the initial food material is brought into contact with both plates from below and from above, the initial food material is then somewhat compressed and heated by the plates, and cooked during the set time. Then the lower plate is withdrawn downwardly and the finished product is removed from the apparatus. This operation substantially corresponds to the operation of the apparatus disclosed in our U.S. patent application Ser. No. 801,781.

Figure 3:
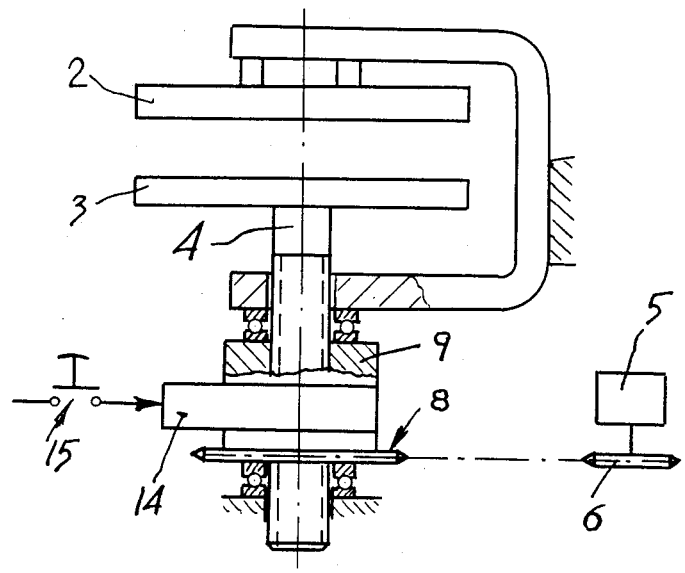
FIGS. 3, 4, 5 and 6 are views showing four modifications of a drive for stepped movement of one of the cooking plates in the apparatus.

In accordance with a new important feature of the present invention the movement of a movable plate, here the lower plate, is performed in a stepped manner. As shown in FIG. 3, the drive motor 5 is connected with the lower plate and more particularly with the nut 9 via a single revolution clutch 14. Such clutches are known in the art. A push button 15 is connected with the clutch 14 and actuatable by a user. The motor 5 continuously drives one clutch half, while upon depressing the other clutch half it stays connected with the one clutch half only during one revolution. After this the clutch is disengaged ( its halves disengage from one another). The cycle is repeated in response to next depressing of the push buttom. By repeated depressing of the push buttom 15, the user moves the lower plate toward the upper plate in a stepped manner prior to contact of both plates with the initial food material, and after the contact has been achieved to a point when a desired pressure in the initial food material is reached. Then the cooking takes place. The clutch is formed so that after cooking its halves are permanently engaged with one another and the lower plate is withdrawn downwardly in a continuous manner.

Figure 4:
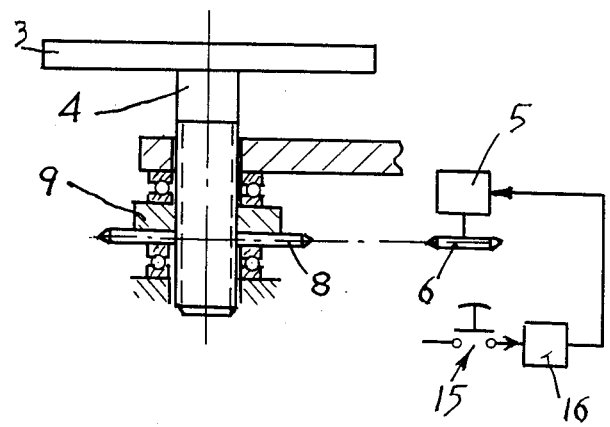

In the embodiment shown in FIG. 4 the motor 5 is formed as a stepper motor and connected with the nut. The push button 15 is connectable with the stepper motor 5 via a pulse generator 16 with a preprogrammable number of pulses. Such pulse generators are known in the art. When a user depresses the push button 15, the pulse generator 16 supplies to the stepper motor 5 the preprogrammed number of pulses and therefore the stepper motor operates in impulse or stepped manner. The lower plate is moved toward the upper plate also in a stepped manner.

Figure 5:
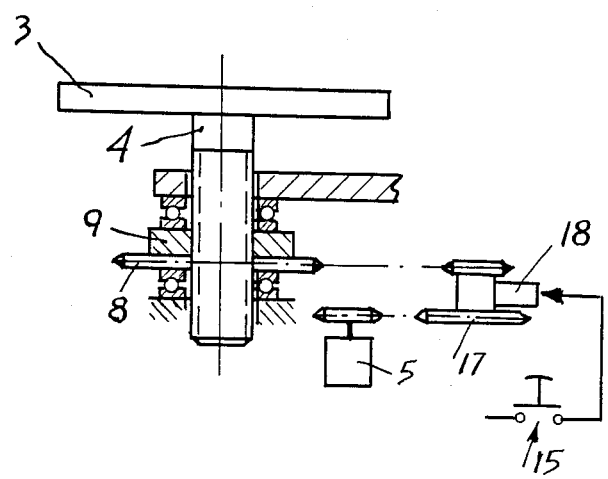

In the embodiment shown in FIG. 5 the motor 5 is connected with the nut via a clutch 17. A counting and switching member 18 is further associated with the clutch 17. The member 18 is reprogrammable. It counts the number of revolutions of the clutch shaft or the clutch half connected with the motor 5, and after the preprogrammed number of revolutions has been reached switches the other clutch half so that it disengages from the one clutch half. The cycle is repteated upon depressing the push button. The lower plate is therefore moved toward the upper plate in such a manner that the user must push a button to activate every next step. The reverse movement of the lower plate in FIGS. 4 and 5 as well as in the next embodiment is performed in a continuous manner.

Figure 6:
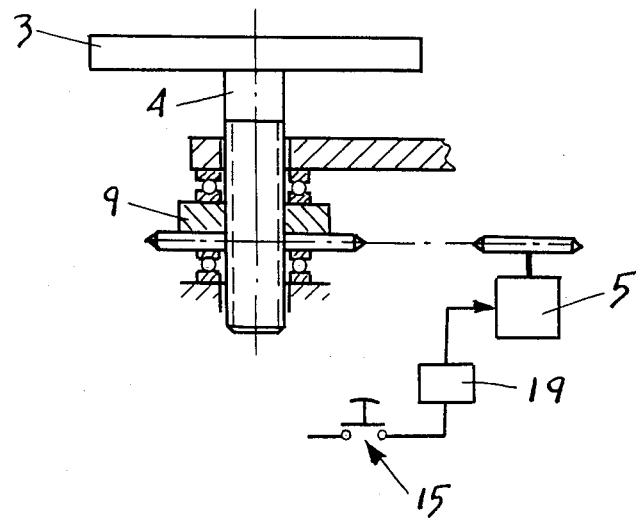

In the embodiment of FIG. 6 the motor 5 is connected with the nut. The push button 15 is connected with the motor 5 via a timer 19 with a presettable time. When the push button 15 is depressed, the motor 5 is turned on and operates during the time determined by the presetting of the timer 19. Then the motor 5 stops. The user again depresses the push button 15 and the cycle is repeated.

In all embodiment shown in FIGS. 3-6 the user repeatedly depresses the push button and produces the stepped movement of the lower plate toward the upper plate. The movement of the lower plate away from the upper plate is performed continuously. It is to be understood that the movable plate is not necessarily the lower one. In a cooking apparatus the lower plate can be made stationary, while the upper plate moves toward and away from the lower plate. The stepped movement means will be associated in this case with the upper plate.

The cooking apparatus in accordance with the present invention is further provided with a protective element 20 to be positionable between the plates and the food material so as to prevent excessive dirtying of the plates. The protective element 20 can be formed as a sheet or film of silicon rubber, tetrafluoroethylene etc.

Figure 9:
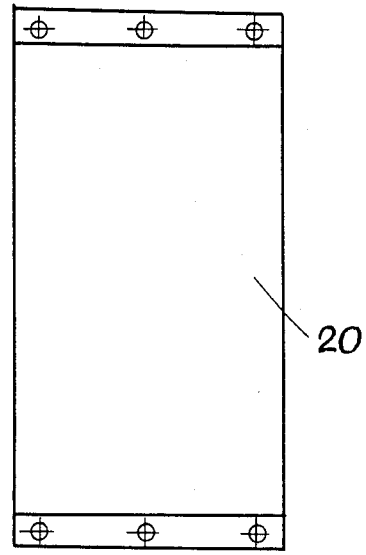
FIG. 9 shows the protective element individually.

As can be seen from FIG. 9 it can be provided with opening(s) at its each end, and possibly with reinforcing strips. The protective element is inserted into the space between the plates to stay there during cooking. It can be withdrawn from this space either after each cooking cycle, or after several cooking cycles, or even once a day for cleaning purposes. One end of the protective element is connectable with the upper plate for example by means of a screw 21 and a clamp 22 for convenient handling. The other end of the protective element extends in the inserted position shown in FIGS. 7 and 8 outwardly beyond the plates and is provided with an end piece 23 connectable by a snap pin 24 with the protective element. The connection of the members 21,22 and 23,24,25 to the respective ends of the protective element 20 is performed for example through the end openings in the latter, or just via clamping forces.

A device is further provided for inserting the protective element into the space between the plates and withdrawing the same from the space. It includes two handles 26 which are connected with a rod 27 connecting two rollers 28 and 29 with one another. As can be seen from FIG. 8 , the upper plate 2 is smaller than the lower plate 3, and the handles 26 extend outside of the lateral sides of the upper plate. The rollers 28 and 29 are in turn located behind the rear side of the upper plate. When a user holds the handles 26 and moves them in direction toward the space between the plates, the rollers 28 and 29 are moved toward the rear end of the apparatus and the protective element 20 assumes its working position shown in FIG. 7. The protective element 20 is withdrawable from the space by a reverse movement of the handles.

Figure 7:
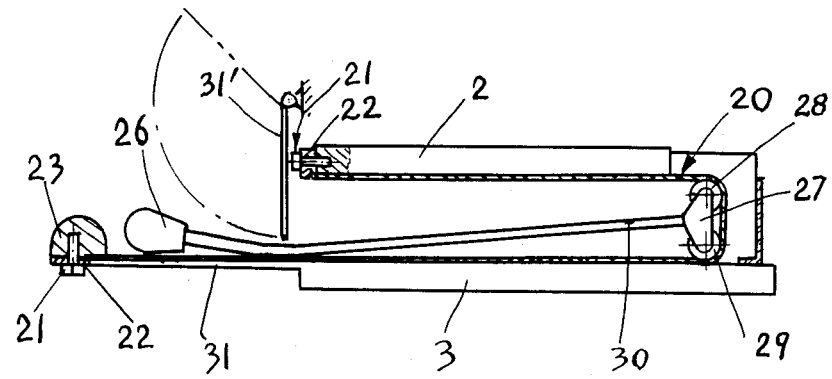

As can be seen from FIG. 7 the handles 26 have raised portions 30. If the handles and therefore the protective element are not completely pushed into the space to assume the working position, the projecting part of the raised portions, shown in dotted lines, will prevent a door 31 of the apparatus from closing. This can be immediately determined by a user visually. When the operation can start only with the closed door (start switch is connected with the door) the apparatus will operate only after the handles 26 have been pushed completely and the door 31 assumes its vertical position shown in solid lines.

Figure 10:
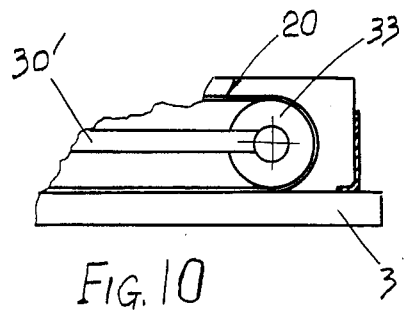

As can be seen from FIGS. 8, 11 and 12, the apparatus has a small front tray 31 and side walls 32. The protective element 20 and the side walls 32 are arranged so that the lateral sides of the protective element are somewhat bent upwardly to prevent spillage of juices from the food material. Finally, only one roller 33 can be provided, as shown in FIG. 10, for winding the protective element therearound. In this case the handles 26 are connected directly with the roller 33, for example with its axle of rotation.

As mentioned hereinabove, the upper plate 2 is smaller than the lower plate 3. This provides for a considerable advantage in the following manner. The heaters of both plates are connected with an electrical source and therefore must be heated equally. However, as well known, heat travels upwardly. Therefore cooking heat from the food material which is being cooked is transferred predominantly to the upper plate. Even some heat from the lower plate travels upwardly and is transferred to the upper plate. Thus, if the plates are of the same size (area and thickness) they would have different quantitites of heat, which during the extensive use period can result in non-qual temperature regardless of the work at temperature controllers. When in accordance with the present invention the upper plate is made smaller than the lower plate (the same thickness but a smaller area, or the same area but the smaller thickness, or both the area and the thickness are smaller in the upper plate ), the plates can better maintain the same temperature which is important for uniform heat supply to upper and lower sides of the food material.

Figure 15:
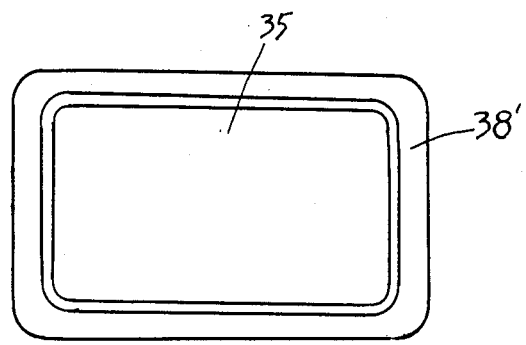
FIG. 15 shows another modification of the steam generating device.

A further very important feature of the present invention is that the apparatus is provided with a device for adding steam in the process of cooking. As can be seen from FIGS. 13 and 14, it is formed as a small supporting container which has a portion 35 for accommodating an initial food material and a portion 36 for accommodating water. During cooking, the water evaporates and forms a steam barrier around the food material. This is useful for adding of moisture to some dry initial food materials since the steam partially penetrates into the cooking area above the portion 35 and into the food material. It also prevents excessive escape of juices and their vapors from the food material and the cooking area. The barrier function is especially effective in the device shown in FIG. 15 in which a water accommodating (steam producing) portion 38 peripherally surrounds the food accommodating portion 38 to form a peripherally uninterrupted steam barrier around the food material during its cooking. With the provision of the steam barrier around the food material and steam supply into the food material the process of cooking is intensified so that the speed of cooking is reduced and the quality of the finished product is increased.

Finally, a further very important feature of the present invention is that one of the plates, for example the upper plate 2, can be moved away from the lower plate in a direction which is different from the direction of working movements—vertically toward and away from the lower plate. In accordance with this new feature the plate, for example the upper plate can be even completely removed from the apparatus and then placed back into it. This additional movement of one of the plates in a different direction or removal of the plate increases the space between the plates or actually opens it, thus allowing easy cleaning of the plates.

Figure 16:
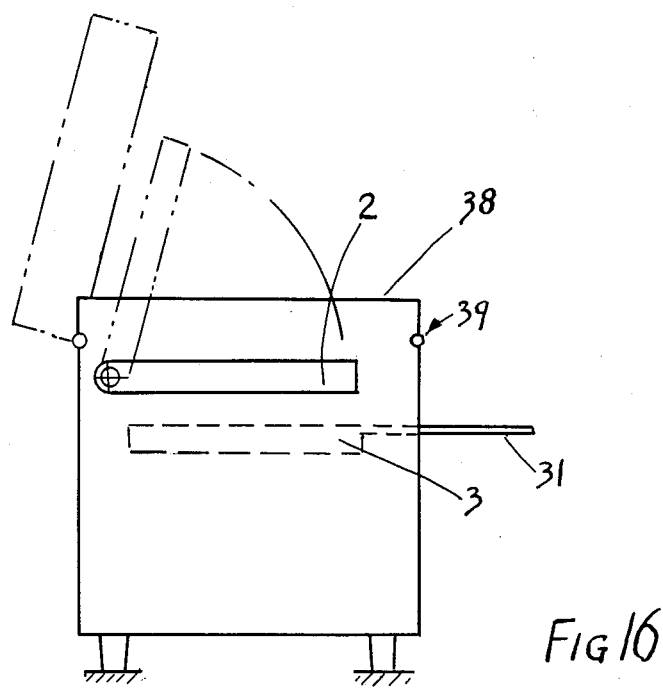
FIGS. 16, 17 , 18 and 19 show four modifications of a construction for allowing movement of one of the cooking plates relative to the other cooking plate for cleaning purposes.

As can be seen from FIG. 16, the upper plate 2 is mounted pivotally about a horizontal axis. In working condition it is fixed in its horizontal position by (not shown) fixing means, which can be released for pivoting of the upper plate. A cover 38 is also pivotable about a horizontal axis and is locked in working condition in its horizontal position by a lock 39. For cleaning purpose, the lock 39 is opened, the cover 38 is pivoted upwardly, and then the upper plate 2 is also pivoted upwardly. In this position of the upper plate the plates can be cleaned easily. Pivoting means such as pivot pins or shafts are known in the art and now shown in the drawing.

Figure 17:
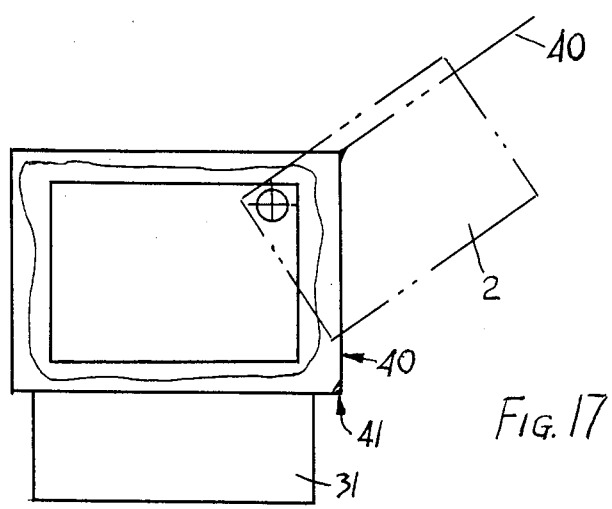

FIG. 17 is a plan view and shows another modification of the above feature. Here the upper plate 2 is pivotable about a vertical axis sideways. The side wall 40 is also pivotable about a vertical axis. Upon opening of a lock 41, the side wall 40 can be opened by turning it to the side, and then the upper plate 2 is turned about its vertical axis to the side as well. The plates now are located so that they are easy to clean.

Figure 18:
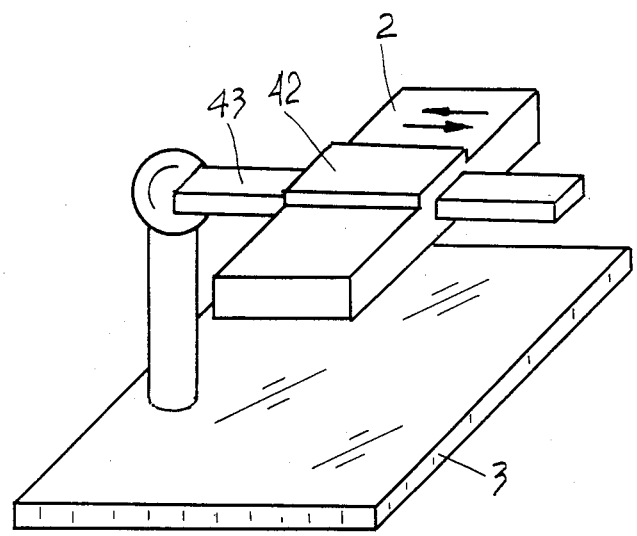

FIG. 18 is a front view of the cooking apparatus in accordance with a further embodiment. The upper plate 2 has a projection 42 slidable on a bar-shaped support 43. The cross sections of the support and projection opening can be square to prevent relative pivoting. The plate 2 can be slid so as to be withdrawn from the lower plate 3 in a transverse direction. The upper plate 2 can even be completely removed from the support 43. This again makes cleaning of the plates very easy. If the upper plate 2 is removed from the support 43, it can thereafter be placed back onto the support by moving the upper plate in the direction opposite to the direction of the arrow.

Figure 19:
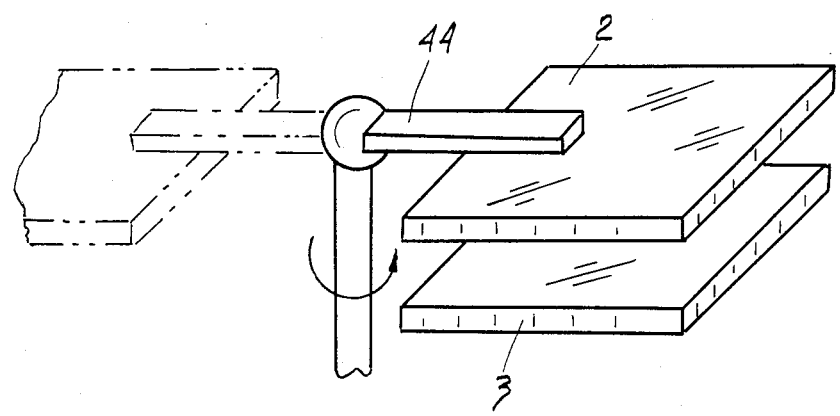

Finally, FIG. 19 which is also a front view, shows an upper plate 2 which is supported on a support 44, and the latter is pivotable about a vertical axis together with the upper plate to a position shown in dotted lines, to facilitate cleaning.

The invention is not limited to the details shown since various modifications and structural changes are possible without departing in any way from the spirit of the present invention.

What is desired to be protected by Letters Patent is set forth in particular in the appended claims.

We claim:
1. An apparatus for cooking food, comprising
two solid plates, said plates being heatable and one of said plates being movable relative to the other of said plates;
means for heating said plates; and means for driving said one plate so as to move said one plate relative to said other plate so that when an initial food material is placed between said two plates and said plates have been heated and said one plate has been moved toward said other plate, the initial food material is subjected to the action of heat and pressure of said plates and cooking is performed under the simultaneous action of high temperature and high pressure, said driving means being formed so that said one plate is movable by said driving means toward said other plate in a stepped manner so that a risk of catching a part of the user's body between said plate is reduced.

2. An apparatus for cooking food as defined in claim 1, wherein said driving means is formed so that said one plate is movable by said driving means away from said other plate is a continuous manner.

3. An apparatus for cooking food as defined in claim 1, wherein said driving means including a drive motor, a clutch connecting said drive motor with said one plate, and an actuating member operative for actuating said clutch in a stepped manner so as to connect said drive motor with said one plate in a stepped manner and therefore to move said one plate toward said other plate in a stepped manner.

4. An apparatus for cooking food as defined in claim 1, wherein said driving means includes a stepper motor connected with said one plate, a pulse generator supplying impulse signals to said stepped motor, and an actuating member arranged to actuate said pulse generator so that the latter actuates said stepped motor by the impulse signal and therefore in a stepped manner so as to move said one plate in a stepped manner.

5. An apparatus for cooking food as defined in claim 1, wherein said driving means includes a drive motor, a clutch connecting said drive motor with said one plate and having a rotatable clutch member, and a counting member arranged to count the numbers or revolution of said rotatable clutch member and actuate said clutch in response to a predetermined counted number of revolutions of said rotatable clutch member.

6. An apparatus for cooking food as defined in claim 1, wherein said driving means includes a drive motor connected with said one plate, and a timer connected with said drive motor and operative for actuating said drive motor in a predetermined time so as to provide actuation of said drive motor in a stepped manner so as to move said one plate in a stepped manner.

7. An apparatus for cooking food as defiend in claim 1; and further comprising a protective element insertable into a space between said plates and separating an initial food material from said plates to prevent a direct contact therebetween during cooking, and withdrawable from said space after cooking.

8. An apparatus for cooking food as defined in claim 7 ; and further comprising means for inserting said protective element into said space and withdrawing said protective element from said space and including a handle member connectable with said protective element and graspable by a user.

9. An apparatus as defined in claim 8 , wherein said protective element is sheet -like, said inserting and withdrawing means also including a roller over which said sheet-like protective element is wound, said handle member being connected with said roller so as to move the latter during insertion and withdrawal of said protective element.

10. An apparatus for cooking food as defined in claim 1; and further comprising means forming a steam so as to provide a steam barrier around an initial food material during its cooking for trapping the juices inside the initial food material.

11. An apparatus for cooking food as defined in claim 10, wherein said steam forming means includes a support having one portion arranged to support an initial food material during cooking, and another portion arranged to accommodate a liquid which evaporates during cooking and forms the steam.

12. An apparatus for cooking food as defined in claim 11, wherein said another portion of said support is formed so that it extends around said one support portion, said both support portions being formed as depressions in said support and separated from one another by a partition.

13. An apparatus for cooking food as defined in claim 1, wherein said plates include an upper plate and a lower plate, said upper plate being smaller than said lower plate so that despite predominant transfer of heat to said upper plate as a result of natural heat movement upwardly, said plates nevertheless retain substantially equal amounts of heat.

14. An apparatus for cooking food as defined in claim 13, wherein said support means includes pivot means for supporting said first plate pivotably in said different direction, about a horizontal axis.

15. An apparatus for cooking food as defined in claim 13, wherein said support means includes pivot means for supporting said first plate pivotably in said different direction , about a vertical axis.

16. An apparatus for cooking food as defined in claim 13, wherein said support means includes sliding means for supporting said first plate slidingly in said different direction and transversely to said predetermined direction.

17. An apparatus for cooking food as defined in claim 13, wherein said support means includes a support member arranged to support said first plate during cooking and formed so that said first plate is removable from said support member after cooking.

18. An apparatus for cooking food as defined in claim 1, wherein said one plate is movable relative to said other plate in a predetermined direction,said plates including first and second plates, said first plate being movable relative to said second plate in a further direction which is different from said predetermined direction so as to provide easy handling of said plates; and further comprising support means for supporting said first plate and allowing the latter to move in said different direction.

19. An apparatus for cooking food as defined in claim 1, and further comprising support means arranged to support said plates, said support means including a support member which supports at least one of said plates so that said at least one of said plates is supported during cooking, but can be removed from said support member after cooking.

20. An apparatus for cooking food as defined in claim 1, wherein said plates include a lower plate and an upper plate, said lower plate being movable relative said upper plate in a substantially vertical direction

* * * * *